United States Patent [19]
Homeier

[11] 3,871,510
[45] Mar. 18, 1975

[54] MAGNETIC CONVEYOR STRUCTURE

[75] Inventor: Ronald F. Homeier, Plainfield, Ind.

[73] Assignee: FMC Corporation, San Jose, Calif.

[22] Filed: Apr. 19, 1973

[21] Appl. No.: 352,834

[52] U.S. Cl.................. 198/41, 198/195, 335/303
[51] Int. Cl............................................ B65g 17/46
[58] Field of Search .............. 198/41, 195; 335/303

[56] References Cited
UNITED STATES PATENTS

| | | | |
|---|---|---|---|
| 1,149,647 | 8/1915 | Harwood | 198/195 |
| 2,486,415 | 11/1949 | Huntar | 198/41 |
| 2,708,022 | 5/1955 | Pettigrew | 198/41 |
| 2,782,516 | 2/1957 | Stoeckel et al. | 198/41 |
| 2,906,239 | 9/1959 | Socke | 198/41 |
| 3,460,492 | 8/1969 | Dickinson et al. | 198/41 |
| 3,581,873 | 6/1971 | Spodig | 198/41 |
| 3,650,217 | 3/1972 | DeRose | 198/41 |
| 3,669,247 | 6/1972 | Pulver | 198/195 |
| 3,719,265 | 3/1973 | Redding et al. | 198/41 |

Primary Examiner—Evon C. Blunk
Assistant Examiner—Richard K. Thomson
Attorney, Agent, or Firm—J. F. Verhoeven; C. E. Tripp

[57] ABSTRACT

A series of articulated conveyor segments form a conveyor belt or conveyor chain including flat top attachments, each of which incorporates a permanent magnet for magnetically holding metallic articles on the attachments. Various species of the attachment include a metal piece which supports a strip of flexible magnetic material.

3 Claims, 10 Drawing Figures

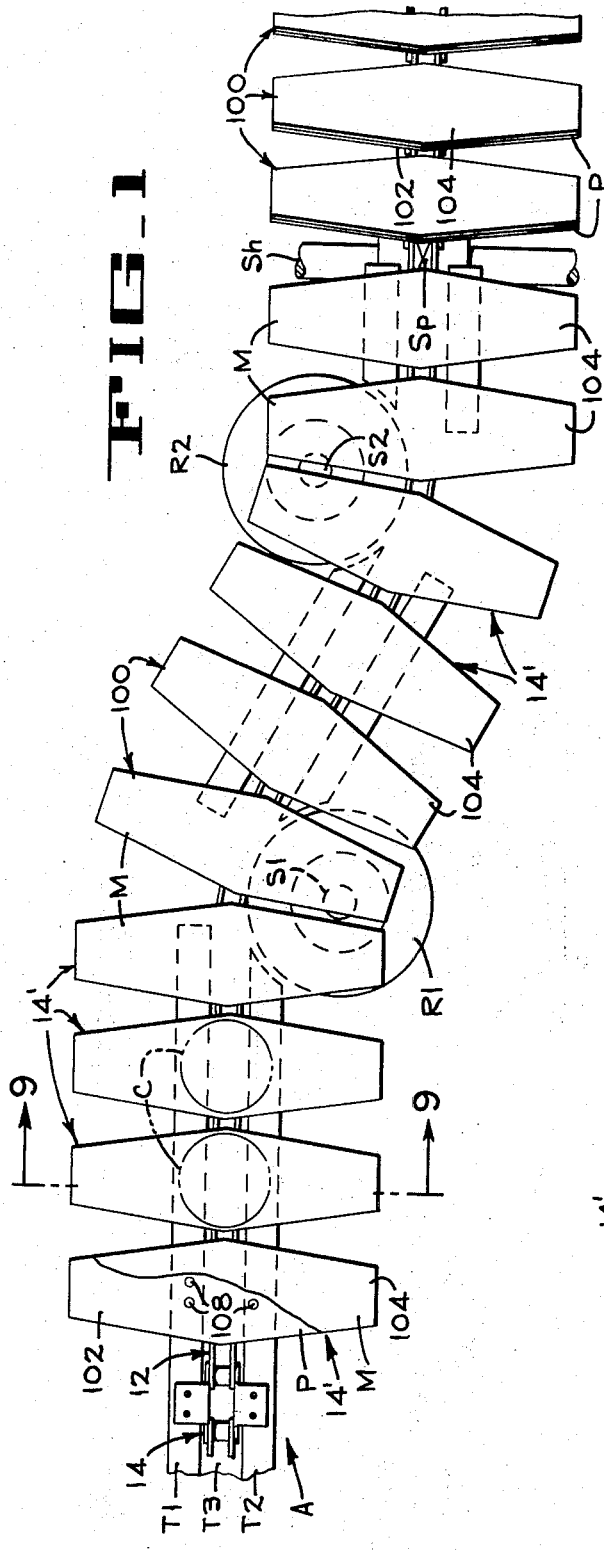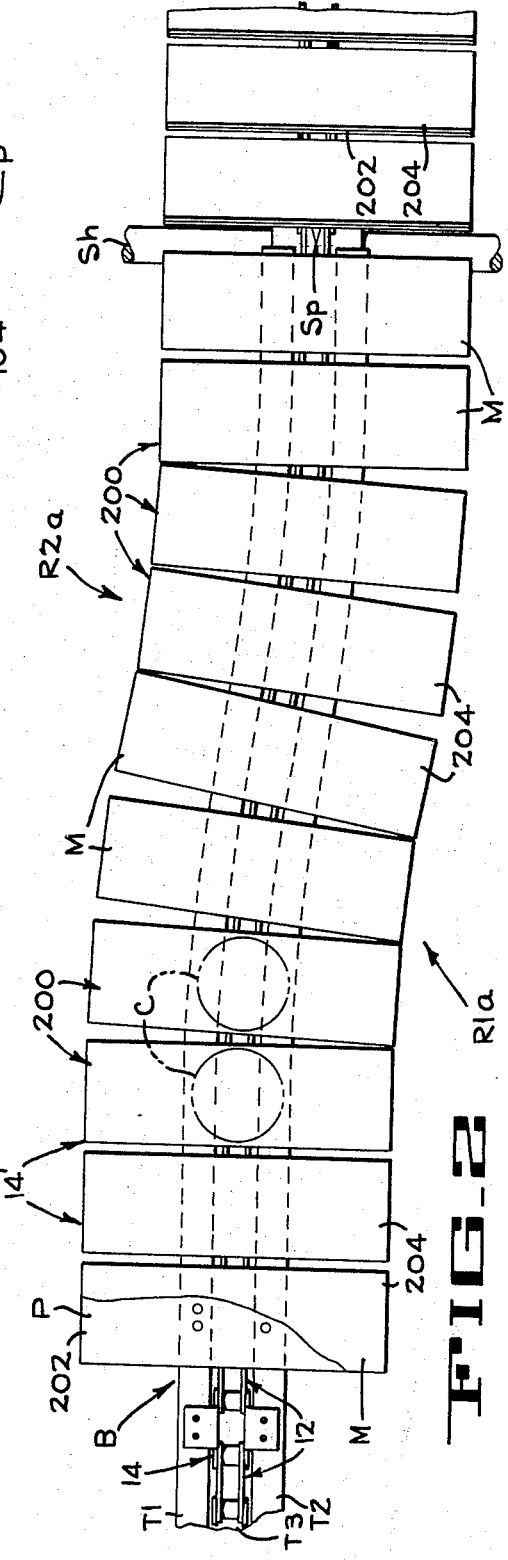

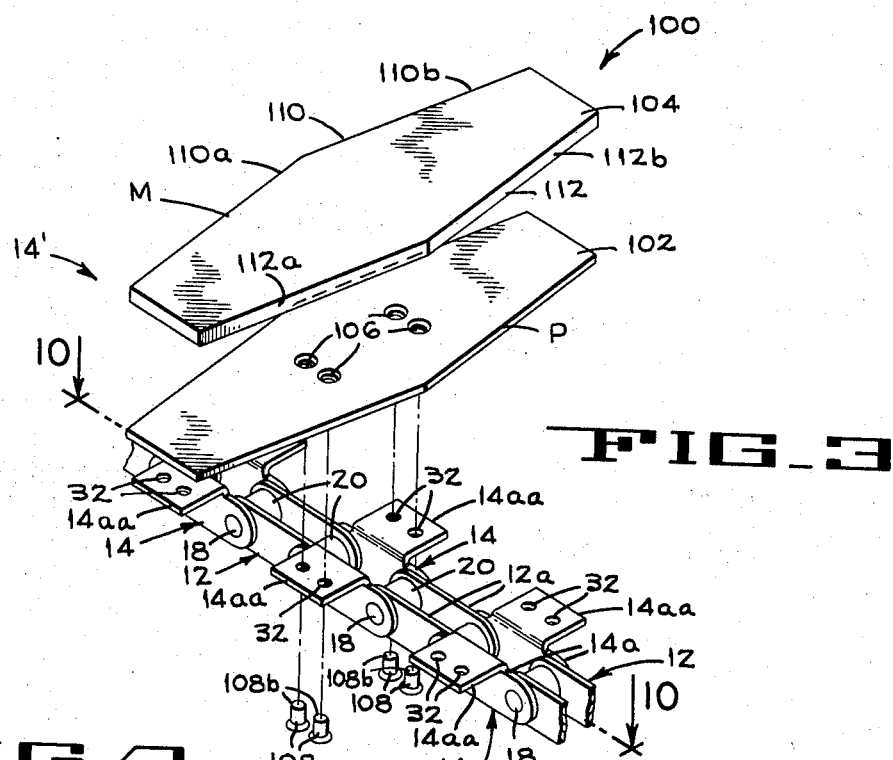
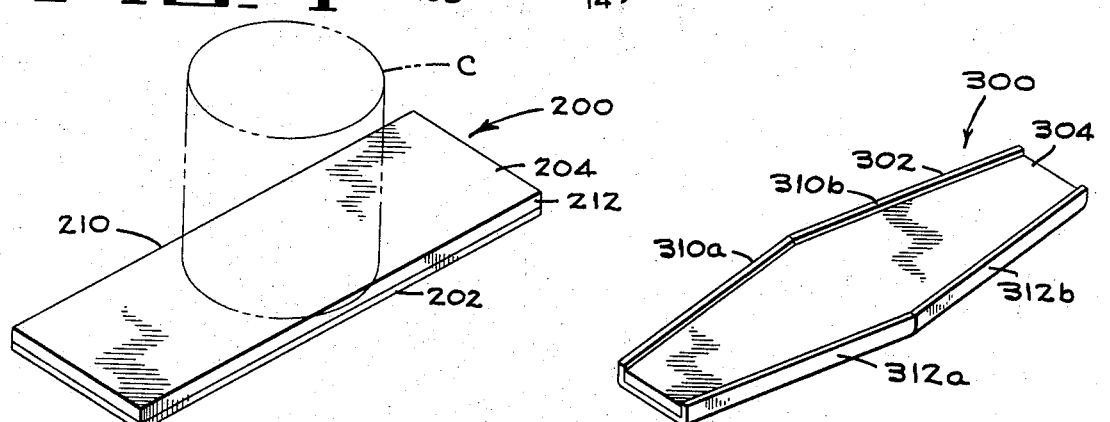
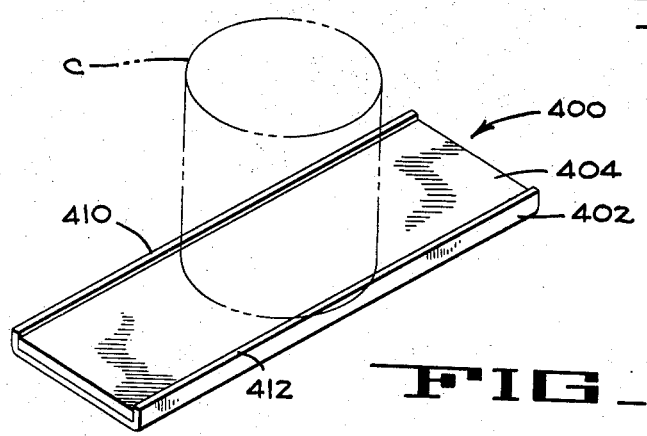

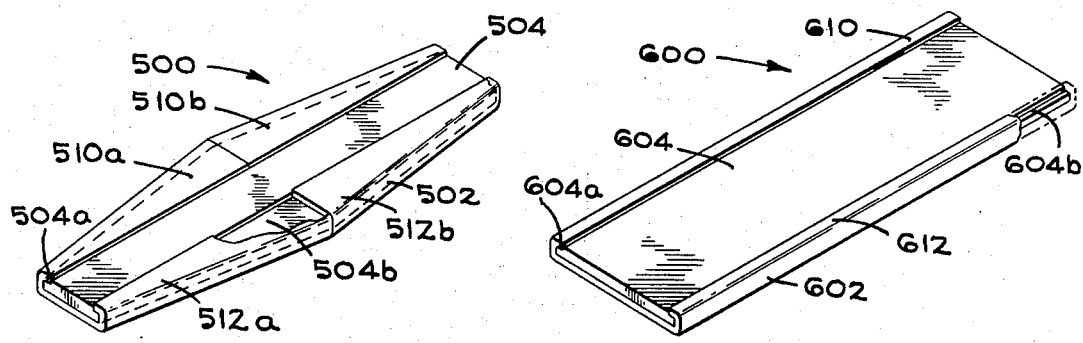
FIG_7
FIG_8
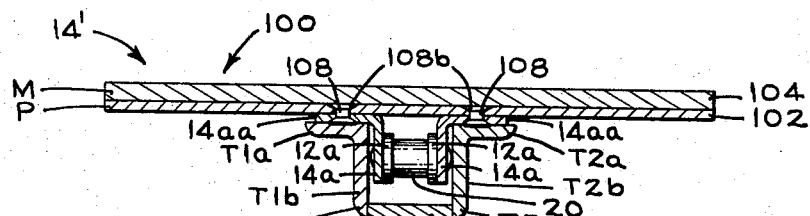
FIG_9
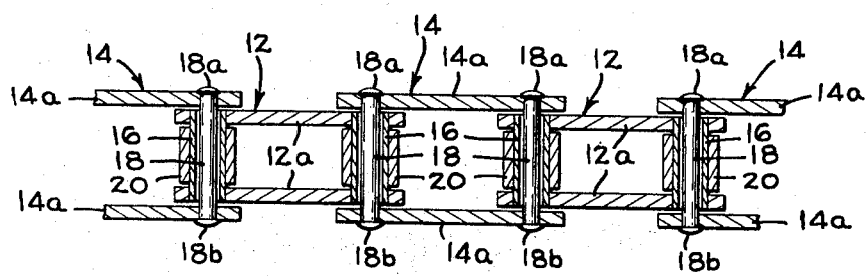
FIG_10

MAGNETIC CONVEYOR STRUCTURE

BACKGROUND OF THE INVENTION

1. Field of the Invention

This invention specifically relates to a conveyor chain including article supporting, flat top attachments that include magnets, and, more broadly relates to articulated conveyor segments including platform members having permanent magnets therein.

2. Description of the Prior Art

One common type of conveyor, generally referred to as a flat top chain conveyor, has a chain to which are secured flat top attachments on which articles are carried. Such conveyors are generally used to carry metallic articles, such as cans, in a horizontal plane. If the articles must be moved into a different plane, article transfer devices are required to transfer the articles to or from specially constructed chain or belt conveyors that can carry the articles along sloped paths. The use of transfer devices and special conveyors in conveyor systems increases costs, and metallic articles, such as cans, can be damaged by being pushed or bumped at the transfer points.

SUMMARY OF THE INVENTION

This invention eliminates the necessity for transfer devices and separate special inclined conveyors in a conveyor system that (a) includes a flat top chain conveyor or the like and (b) is used to transport cans or other metallic articles horizontally or in inclines.

In the conveyor of the present invention, there is provided a series of articulated conveyor segments, some of which have a permanent magnet therein. The conveyor segments are pivotally connected for movement along straight and curved paths in horizontal and sloped paths.

In a preferred form of the invention, a conveyor chain having flat top attachments, suited for carrying cans or other metal articles, has permanent magnets incorporated into the attachments. Each is secured to one of the articulated link segments of the chain, and various species of attachments are disclosed. The conveyor chain of the present invention can move in curved and/or straight paths, can move along sloping paths, and can go around horizontal or vertical turns. The magnets, which preferably consist of strips of flexible material, will hold the cans, or other metal articles, on the conveyor regardless of the path the conveyor takes.

The novel features which are considered to be characteristic of the invention are set forth in the appended claims. The invention, itself, however, will be best understood from the following description of a specific embodiment thereof when read in connection with the accompanying drawing.

BRIEF DESCRIPTION OF THE DRAWINGS

FIG. 1 is a plan view of a portion of a conveyor system including a side bending chain provided with one species of flat top attachments.

FIG. 2 is a plan view of a portion of a conveyor system including a side bending chain provided with another species of flat top attachments.

FIG. 3 is an exploded, perspective view showing the species of attachment of FIG. 1 and the manner in which it is attached to a link of the conveyor chain.

FIG. 4 is a perspective view of the species of attachment of FIG. 2.

FIGS. 5 through 8 are perspective views of further species of attachments.

FIG. 9 is a section taken along line 9-9 of FIG. 1.

FIG. 10 is a section taken along line 10-10 of FIG. 3.

BRIEF DESCRIPTION OF THE PREFERRED EMBODIMENT

The present invention provides a chain type conveyor belt that includes a series of articulated or pivotally interconnected conveyor segments 12 and 14', adapted for movement along a conveyor path, in which the conveyor segments 14' include platform members P having permanent magnets M. In the illustrated form of the invention, only the conveyor segments 14' include a platform member P and a magnet M, but it is to be clearly understood that the conveyor segments 12 could be modified to each include a platform member P and a magnet M, without departing from the scope of the present invention. In the illustrated form of the invention each platform member P and associated permanent magnet M is suitably attached to a link section 14 and, consequently, is hereinafter referred to as an "attachment." It will however be apparent that each platform member and associated permanent magnet can be made an integral part of a conveyor segment in which case the platform member and permanent magnet are not "attachments" as the term is used herein.

Six species of flat top attachments, identified respectively by numerals 100, 200, 300, 400, 500 and 600, are illustrated in the drawings. FIGS. 1 and 2 illustrate the use of two of the species of attachments (100 and 200) in respective conveyor chains A and B, constituting chain type conveyor belts, of respective conveyor systems. Cans C are shown being carried on two platform members of each of the conveyors, the articles being omitted from the other platform members for clarity. The various attachments 100, 200, ... 600 are suitably attached to link side plates articulated in a known manner to form a side bending chain that can travel sidewardly around radiused turns. Briefly, the chains A and B are comprised (see FIG. 10) of roller links 12, pin links 14, sleeve bushings 16, connecting rivet pins 18 and rollers 20. Each roller link 12 includes two side plates 12a. Each pin link 14 includes two side plates 14a. Rollers 20 encircle the sleeve bushings 16 which have bushing ends fitted into holes in the ends of opposed side plates 12a. The pins 18 are cylindrical members of smaller diameter than the inner diameter of the sleeve bushings 16. The roller links 12 and pin links 14 are articulated or pivotally interconnected by the pins 18 which are disposed within the sleeve bushings 16 with the end portions of the pins pressed into round holes in respective ends of opposed side plates 14a. Thus the chain defined by the links can turn in a vertical plane.

One end 18a of each pin has an enlarged head, and the opposite ends 18b of the pins are upset to form a second enlarged head. The pins 18 are long enough to provide lateral space between respective side bars 12a and 14a. Since the pins 18 fit loosely into the sleeve bushings 16, the pins may extend angularly to the axis of the bushings 16 when the chain is traveling around a curve in a horizontal plane.

The links 12 and 14 are interconnected, or articulated, by the pins 18 to form a section, or length, of chain, illustrated in FIGS. 1 and 2, comprised of a series of articulated conveyor segments 12 and 14'. The illustrated conveyor segments 14' are similar to conveyor segments 12 except that each conveyor segment 14' includes a platform member P and a permanent magnet M whereas the conveyor segments 12 lack such elements. In this instance, the two side plates 14a, 14a of each pin link 14 each include lateral lugs 14aa, as shown in FIG. 3. Each lug 14aa includes two round holes 32 used for receiving rivet pins that secure an attachment to each link segment 14'.

Articulated link segments 12 and 14' illustrated in FIGS. 1 and 2 have attachments secured to the respective links 14 to form a flat top conveyor chain. Thus, in the chain A of FIG. 1, the articulated link segments 12 and 14' are illustrated as carrying attachments 100 and in the chain B of FIG. 2 the articulated link segments 12 and 14' are illustrated as carrying attachments 200.

The conveyor systems shown in FIGS. 1 and 2 (see FIG. 9) include guide tracks T1 and T2, formed of angle iron, connected by a member T3 and supported by structural members not shown. The guide tracks provide two spaced surfaces T1a and T2a facing the bottom sides of the attachments 100 or 200 and further provide two spaced surfaces T1b and T2b which confine the chain link segments 12 and 14 therebetween.

In FIG. 1 it is illustrated that sections of the guide tracks T1 and T2 are cut out to provide openings for rollers R1 and R2 mounted for rotation about suitably supported vertical shafts S1 and S2. The rollers are placed at horizontal turns of the chain path to provide rotatable roller surfaces. Side plates 12a, 14a and the ends of connecting pins 18 can move without difficulty into contact with and past the roller surfaces. In FIG. 2 the guide tracks are continuous throughout regions R1a and R2b of respective horizontal turns and no rollers are provided in these regions since the radius of each turn is large enough to permit reasonably easy sliding movement of ends of pins 18 along track surfaces T1b and T2b in these portions of the tracks. Links 12 and 14 of the chains A and B are shown looped around a rotatable sprocket Sp suitably supported on a horizontal shaft Sh, with the chain extending along a downwardly inclined slope to the right of the sprocket (as viewed in FIGS. 1 and 2).

The attachments 100 (see FIG. 3) are each comprised of a flat piece of sheet metal 102 and a flat strip of magnetic material 104 which are both hexagonal. The piece 102 includes four countersunk holes 106 that receive rivet pins 108. The pins 108 pass through the round holes 32 in the lugs 14aa of links 14, and ends 108b of the pins are upset to secure the piece 102 to the link 14. The magnet 104 is secured to the piece 102 by adhesive material, such as glue, which bonds the bottom side of the magnet to the top side of the piece. The strip 104 and metal piece 102 are hexagonal and define forward and rearward attachment edges 110 and 112. The forward edge of each attachment consists of two sloping portions 110a, 110b. The rearward edge consists of two sloping portions 112a, and 112b. The attachment edges, which slope away from adjacent attachments as they extend outwardly, facilitate turning of the chain conveyor without interference between adjacent attachments.

An attachment 200, illustrated in FIG. 4, is comprised of a flat, rectangular piece of sheet metal 202 having countersunk holes for receiving rivet pins to secure the attachment to a link in the same manner that an attachment 100 is secured to a link 14. A flat rectangular strip of magnetic material 204 is secured by adhesive material to the piece 202. Attachment 200 differs from attachment 100 only in that the piece 202 and strip 204 define a straight forward edge 210 and a straight rearward edge 212 instead of sloping forward and rearward edges as are provided in an attachment 100. As shown in FIG. 2, the slight spacing between adjacent attachments permits turning of the chain conveyor in a horizontal plane but not to the extent of the chain conveyor of FIG. 1.

An attachment 300, illustrated in FIG. 5, includes a strip of magnetic material 304 and a piece of sheet metal 302 and is similar to attachment 100 except that the strip of magnetic material 304 is not adhesively secured to the piece 302. The piece 302 includes four vertical lip sections 310a, 310b, 312a, 312b that are bent upward to clamp the strip 304 in place. Upper edges of the lip sections preferrably extend slightly above the upper surface of the magnet 304 to protect the magnet surface from physical wear. Metal cans or other articles can rest on these upper edges without actually contacting the magnet surface to cause abrasive wear of the magnet when the articles are placed on, or removed from, the attachment. The upper edges can, of course, be situated flush, or even, with the upper magnet surface, and, if physical wear of the magnet surface is not a main consideration, even below the upper surface of the magnet. However, regardless of where the upper edges are situated with respect to the level of the magnet surface, the attachment provides a substantially flat upper surface comprised primarily of magnetic material effective to magnetically grip cans or other metal objects located on the attachment.

An attachment 400, illustrated in FIG. 6, is similar in shape to attachment 200 and includes a metal piece 402 and a strip of magnetic material 404 securely clamped between two vertical lip sections 410, 412 that have been bent upward to effect the clamping action. Upper edges of the lip section extend slightly above, or at least up to the level of, the upper surface of the magnetic strip 404.

An attachment 500, illustrated in FIG. 7, includes a metal piece 502 and a strip of magnetic material 504, and is similar to the attachment 300 except that (a) the piece 502 includes four horizontal lip sections 510a, 510b, 512a and 512b bent over onto the upper surface of the strip 504 and (b) the strip 504 includes forward and rearward shoulder portions 504a, and 504b wherein the lip sections 510a, 510b, 512a and 512b are disposed so as to protrude a slight distance above the upper surface of the strip 504. The lip sections can be, if desired, made to lie flush with the upper surface of the strip.

An attachment 600, illustrated in FIG. 8, is similar to the attachment 400 and includes a metal piece 602 and a strip of magnetic material 604. The piece 602 includes two horizontal lip sections 610 and 612, bent over onto the upper surface of the strip 604. The strip 604 includes forward and rearward shoulder portions 604a and 604b wherein the lip sections 610 and 612 are disposed so as to protrude a slight distance above the upper surface of the strip 604.

The magnetic strip of each attachment 100, 200, . . . . 600 is comprised of a thin strip of flexible material.

The material consists of finely divided, permanently magnetized ferrite particles in a rubber or plastic binder material. Such material, identified by the Trademark KOROSEAL, can be obtained from the B.F. Goodrich Industrial Products Company, a division of B.F. Goodrich Co., Akron, Ohio. KOROSEAL magnets consist of a flexible binder impregnated with a magnetized powder (barium ferrite - $Ba Fe_{12} O_{19}$).

The flexible magnet material is light weight, will not break when subjected to impact forces, can be scratched without breaking, has excellent resistance to demagnetization, and requires replacement only when the material has been worn thin, by physical abrasion thereof. The magnetic strip can be magnetized to provide any desired configuration of magnetic poles.

The metal piece of each attachment 100, 200, . . . 600 serves as a magnet pole piece, or keeper to concentrate the magnetic field of the magnet around the upper surfaces of the magnetic strips so that the desired magnetic gripping action will be improved and made stronger by the presence of the metal pieces.

Six species of attachments 100, 200, . . . 600 have been described and it by now apparent how such attachments form a flat top chain comprised of platform members P and permanent magnets M as illustrated in FIGS. 1 and 2. The attachments fall into two categories based on the attachment configuration. Attachments 100, 300 and 500 are laterally elongated, hexagonal attachments suited for use in conveyor installations wherein a chain including such attachments is to travel through small radiused curves or turns. Attachments 200, 400 and 600 are laterally elongated, rectangular attachments suited for use in conveyor installations wherein a chain including such attachments is to travel through relatively large radiused curves or turns.

Although the best mode contemplated for carrying out the present invention has been herein shown and described, it will be apparent that modification and variation may be made without departing from what is regarded to be the subject matter of the invention.
AML:nlb

What is claimed is:

1. A chain conveyor of the type having a flexible chain of articulated segments for curving movement in horizontal and vertical planes and having a plurality of platforms connected, respectively, to said segments, said conveyor having means to guide said flexible chain along a path, said platforms each having a surface to receive metallic articles to be conveyed, each of said surfaces lying in a plane extending in the direction of movement of the segment to which the platform is connected, the improvement comprising a flexible magnet having a substantially planar surface mounted on each of said platforms to attract said metallic articles for conveyance along the path of said chain.

2. The chain conveyor of claim 1 in which said platforms are detachable from said segments.

3. The chain conveyor of claim 1 in which said magnets have a flat surface and in which said platforms have lip portions at the edges thereof extending above the flat surface of the magnets to support the article in closely spaced relation to said surface.

* * * * *